(12) United States Patent
Uesaka

(10) Patent No.: US 8,037,782 B2
(45) Date of Patent: Oct. 18, 2011

(54) STEERING COLUMN ASSEMBLY

(75) Inventor: Yota Uesaka, Toyohashi (JP)

(73) Assignee: Fuji Kiko Co., Ltd., Kosai-Shi (JP)

( * ) Notice: Subject to any disclaimer, the term of this patent is extended or adjusted under 35 U.S.C. 154(b) by 546 days.

(21) Appl. No.: 12/289,501

(22) Filed: Oct. 29, 2008

(65) Prior Publication Data

US 2009/0107283 A1    Apr. 30, 2009

(30) Foreign Application Priority Data

Oct. 31, 2007   (JP) ................................. 2007-283851

(51) Int. Cl.
B62D 1/18   (2006.01)
(52) U.S. Cl. ......................................................... 74/493
(58) Field of Classification Search .................... 74/492, 74/493; 280/775
See application file for complete search history.

(56) References Cited

U.S. PATENT DOCUMENTS

2004/0061322 A1*   4/2004   D'Agostino et al. ......... 280/775
2006/0266152 A1*   11/2006   Armstrong et al. ............. 74/493

FOREIGN PATENT DOCUMENTS

| EP | 1 070 652 A2 | 1/2001 |
| JP | 3783524 | 3/2006 |
| JP | 2007-038833 A | 2/2007 |
| WO | WO 2007/058158 A1 | 5/2007 |

OTHER PUBLICATIONS

Communication pursuant to Article 94(3) EPC, issued Apr. 8, 2010, in counterpart European Application No. 08018993.9.
Official Action Letter issued on Sep. 27, 2010, in the counterpart Korean application and English translation of text of the Notification of the Official Action; 4 pages total.

* cited by examiner

*Primary Examiner* — Thomas R Hannon
*Assistant Examiner* — Phillip A Johnson
(74) *Attorney, Agent, or Firm* — The Nath Law Group; Jerald L. Meyer; Derek Richmond

(57) ABSTRACT

The steering column assembly includes: an upper clamp 7; a distance bracket 8 fixed to an outer tube 4; a clamp bolt 9 including a shank 9b inserted in tilt long holes formed in the upper clamp 7 and telescopic long holes formed in the distance bracket 8; an operation lever 10 configured to rotate integrally with the bolt 9; a cam body 11 configured of an eccentric cam 41 and a ring 42, the eccentric cam 41 being provided on the shank 9b, the radial dimension of the eccentric cam 41 gradually changing in its circumferential direction, and the ring 42 rotatably fitted on the outer periphery of the eccentric cam 41. The cam body 11 rotates and is pressed against an inner tube 5 to lock the inner tube 5 to an outer tube 4.

8 Claims, 7 Drawing Sheets

FIG. 8
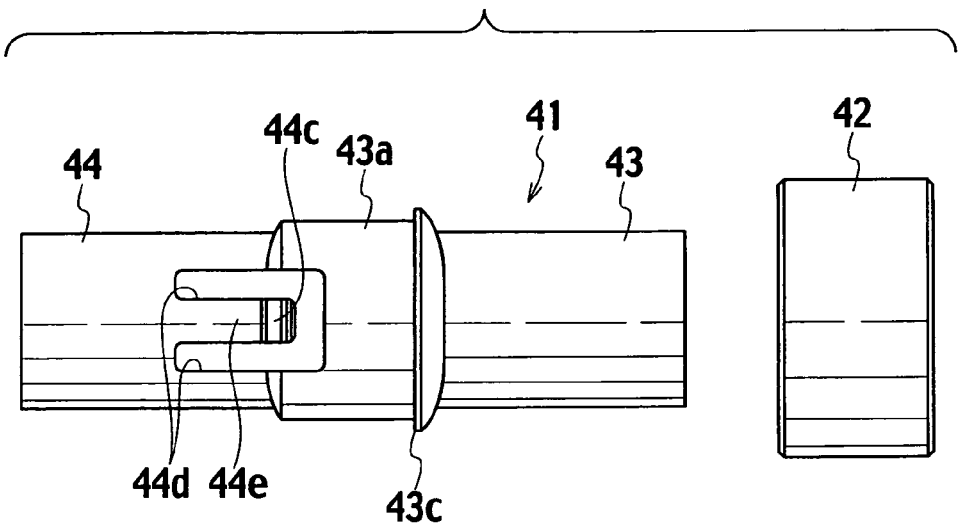
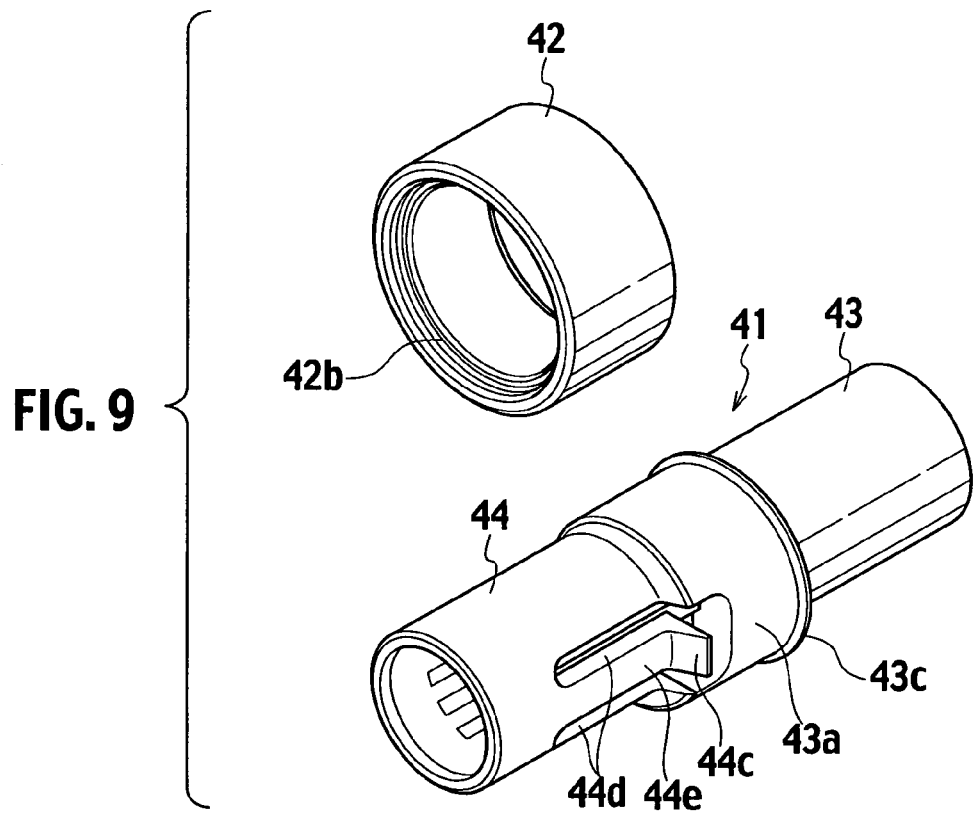
FIG. 9

STEERING COLUMN ASSEMBLY

BACKGROUND OF THE INVENTION

1. Field of the Invention

The present invention relates to a steering column assembly including a telescopic adjustment mechanism which allows a driver to adjust the position of a steering wheel depending on the driver's physique and preference in order that the driver can feel comfortable while driving.

2. Description of the Related Art

Known is a steering column assembly including a tilt adjustment mechanism and a so-called telescopic adjustment mechanism. The tilt adjustment mechanism allows a driver to adjust the height of the steering wheel depending on the driver's physique and driving posture. The telescopic adjustment mechanism allows the driver to adjust the front-back position of the steering wheel in the axial direction of the steering shaft depending on the driver's physique and driving posture.

In general, when a telescopic adjustment is applied to the steering wheel, the steering column assembly of this type causes an eccentric cam to be pressure-contacted to and engaged with an inner tube constituting the steering column, the eccentric cam being attached to the outer periphery of a clamp bolt to rotate integrally with the bolt. Thereby, the inner tube is pressed against the inner periphery of an outer tube, and thus the inner tube is locked to the outer tube. This locking mechanism eliminates play between the inner tube and the outer tube (space between the inner tube and the outer tube in the radial direction). (See Japanese Patent No. 3783524, for example.)

However, the technique disclosed in Japanese Patent No. 3783524 has a problem of poor operability for the following reason. The shank of the clamp bolt constituting the rotary shaft of the eccentric cam is arranged outside the outer tube, so that the space between the shank and the inner tube should be set wide. In addition, the radial dimension of the eccentric cam (the dimension of the eccentric cam from its rotation center to its outer circumferential surface) is relatively large. Consequently, the clamp bolt needs a large clamping torque to obtain a force with which the outer circumferential surface of the cam presses the inner tube, when the inner tube is locked to the outer tube by the rotation of the eccentric cam. Accordingly, the operation lever has to be operated with a larger force.

Furthermore, when a force is applied to the steering column in a direction in which the steering column contracts while the eccentric cam is locking the inner tube to the outer tube, it is likely that the inner tube biases the eccentric cam with a friction force of the inner tube in a direction in which the inner tube is released from the outer tube. In this case, the eccentric cam may rotate, and the inner tube may be accordingly released from its locked condition, so that a so-called "operation lever return" may occur.

SUMMARY OF THE INVENTION

The present invention has been achieved with such points in mind.

It therefore is an object of the present invention to provide a steering column assembly having an improved operability with a less operation force required to be applied to an operation lever for locking and releasing operations, and which is capable of firmly keeping the inner tube locked to the outer tube.

For the purpose of achieving the object of the present invention, a first aspect of the present invention is a steering column assembly including an inner tube having an end being supported by a vehicle body, and rotatably and pivotally supporting a lower shaft therein; an outer tube having an end being supported by a clamp fixed to the vehicle body, rotatably and pivotally supporting an upper shaft therein, arranged in an outer periphery of the inner tube so as to be slidable in an axial direction so that a telescopic adjustment is possible, and having a through-hole opened in the axial direction in a portion overlapped with the inner tube; a distance bracket fixedly arranged in the outer tube; a clamp bolt including a shank rotatably and pivotally supported by the clamp and a long hole part formed in the distance bracket; an operation lever configured to rotate integrally with the clamp bolt; an eccentric cam arranged on the shank of the clamp bolt, and having an radial dimension gradually changing in a circumferential direction thereof; and a ring rotatably fitted on an outer periphery of the eccentric cam, wherein rotationally operating the operation lever rotates the eccentric cam and thus presses the ring against the inner tube, so that the inner tube is pressure-contacted to and engaged with the outer tube.

A second aspect depending from the first aspect is the steering column assembly in which a hole part of the clamp is formed as an arc-shaped long hole extending in an upward-downward direction of the vehicle so that a tilt adjustment is possible.

In the steering column assembly according to any one of the first and second aspects of the present invention, when the operation lever is rotated from an unlock position to a lock position, the eccentric cam is rotated in a lock direction by the clamp bolt. Thereby, the radial dimension of the eccentric cam progressively increases in its circumferential direction. Thus, the eccentric cam presses the inner tube against the outer tube with a ring. Hence, the inner tube is pressure-contacted to and engaged with the outer tube. Finally, the inner tube is locked. Additionally, when the operation lever is rotated from the lock position to the unlock position, the cam body is rotated in an unlock direction by the clamp bolt. Thereby, the radial dimension of the eccentric cam progressively decreases in its circumferential direction. Thus, the ring is detached from the inner tube. Hence, the inner tube is released from the locked condition in which the inner tube is being pressure-contacted to and engaged with the outer tube. This makes it possible for the outer tube to be telescopically adjusted (to be slid in the axial direction) relative to the inner tube by use of a small operation force.

The eccentric cam is pressure-contacted to and engaged with the inner tube with the ring fitted on the outer periphery of the eccentric cam. This arrangement enables the radial dimension of the eccentric cam to make smaller. Accordingly, it is possible to reduce a clamping torque which needs to be applied to the clamp bolt when the outer peripheral surface of the ring is pressed against the inner tube by rotating the eccentric cam to lock the inner tube. For this reason, this embodiment is capable of reducing the operation force needed to be applied to the operation lever, and accordingly of enhancing the operability.

In addition, when a force is applied to the steering column tube in a direction in which the steering column tube contacts while the inner tube is being locked to the outer tube by pressing the outer peripheral surface of the ring against the inner tube, the ring is biased in an unlock direction by a friction force through the inner tube, and thus the ring rotates. However, it is possible to prevent the eccentric cam from rotating in the unlock direction because the ring slips on the eccentric cam. For this reason, the inner tube can be kept being locked to the outer tube firmly. Moreover, the radial dimension of the eccentric cam is smaller than that of an eccentric cam which does not provide with a ring. This decreases a torque for driving the eccentric cam in the unlock direction when the eccentric cam is biased in the unlock direction with the ring. In this respect, it is possible to prevent the eccentric cam from rotating in the unlock direction.

A third aspect depending from any one of the first and second aspects is the steering column assembly in which the bolt and the eccentric cam are formed as separate bodies.

In the steering column assembly according to the third aspect of the present invention, each of the bolt and the eccentric cam can be easily formed with a material and shape which differ from one to another depending on a function which each of the bolt and the eccentric cam is required to play since each of the bolt and the eccentric cam is formed in a separate body.

A fourth aspect depending from any one of the first to third aspects is the steering column assembly in which the eccentric cam includes an elastic claw and a flange member, and by use of the elastic claw and the flange member, the ring is rotatably engaged with and held by the outer periphery of the eccentric cam.

In the steering column assembly according to the fourth aspect of the present invention, it is easy to fit the ring onto the eccentric cam. That is because the ring fitted on the outer periphery of the eccentric cam is rotatably supported by use of the elastic claws and the flange members both provided to the eccentric cam.

BRIEF DESCRIPTION OF THE ACCOMPANYING DRAWINGS

The above and further objects and novel features of the present invention will more fully appear from the following detailed description when the same is read in conjunction with the accompanying drawings, in which.

Figure 3:
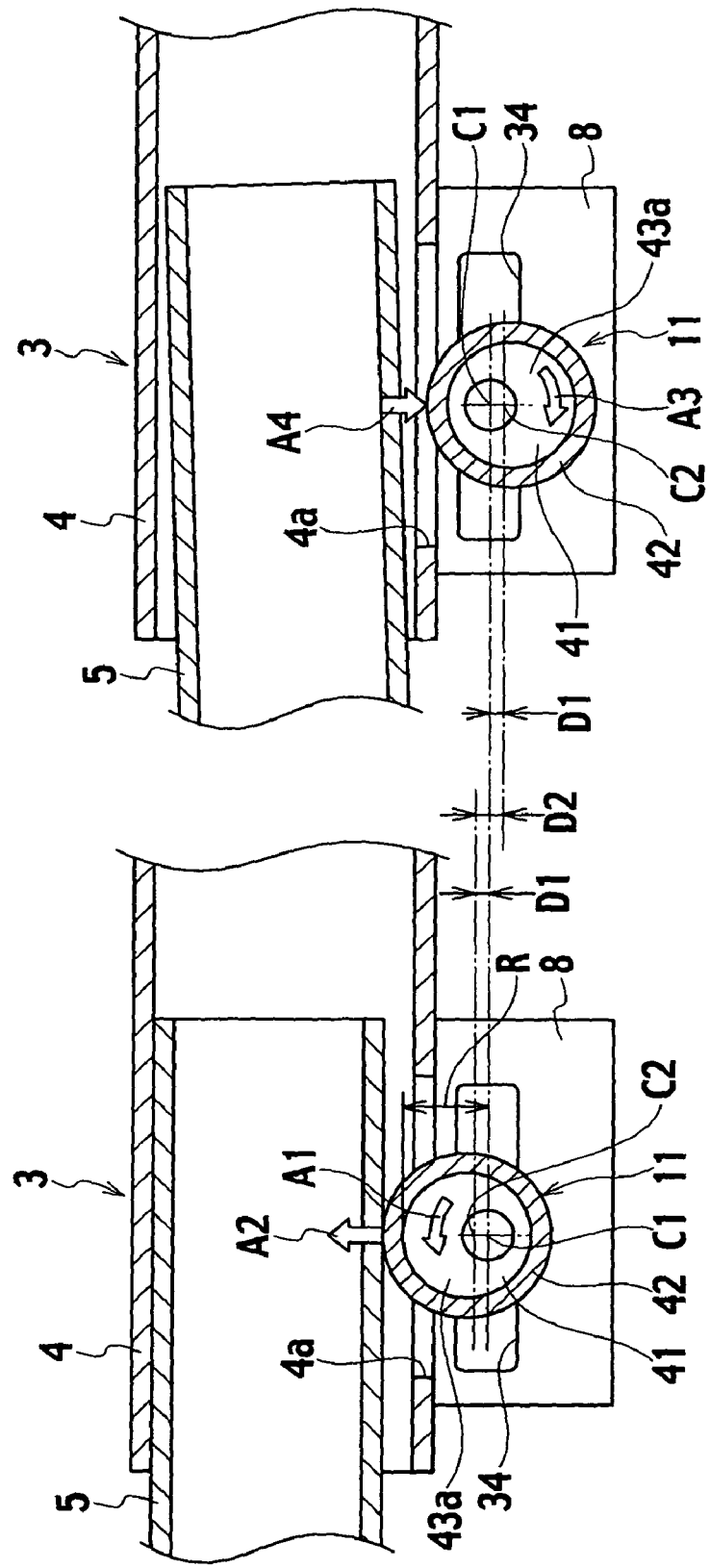
Figure 4:
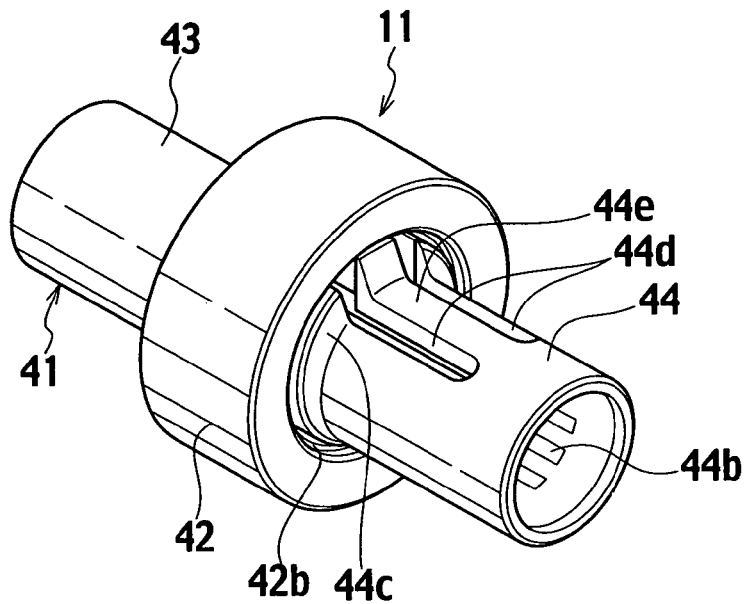
Figure 5:
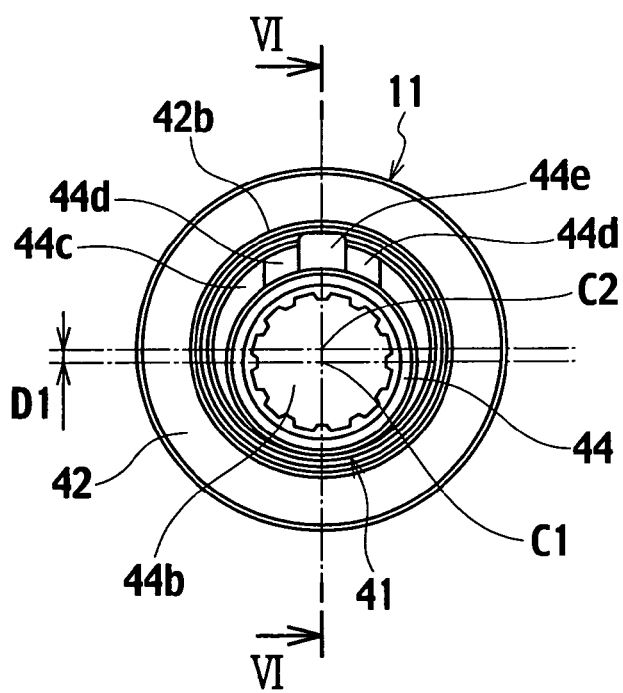
Figure 6:
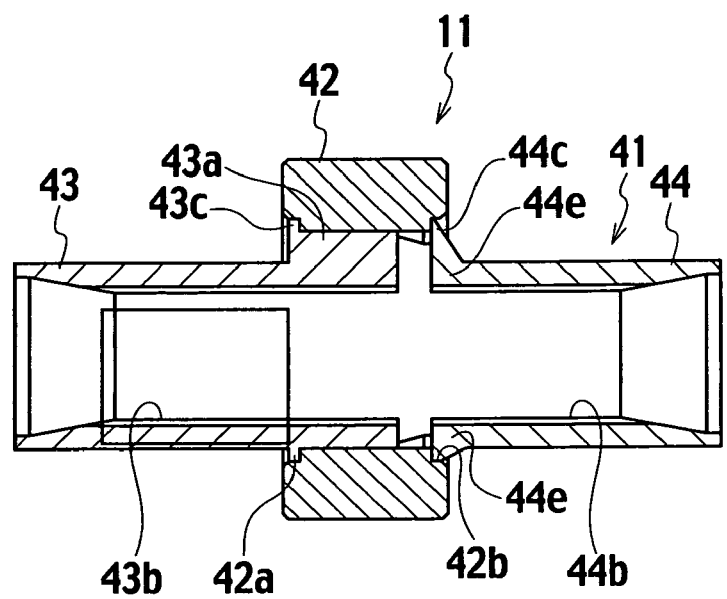
Figure 7:
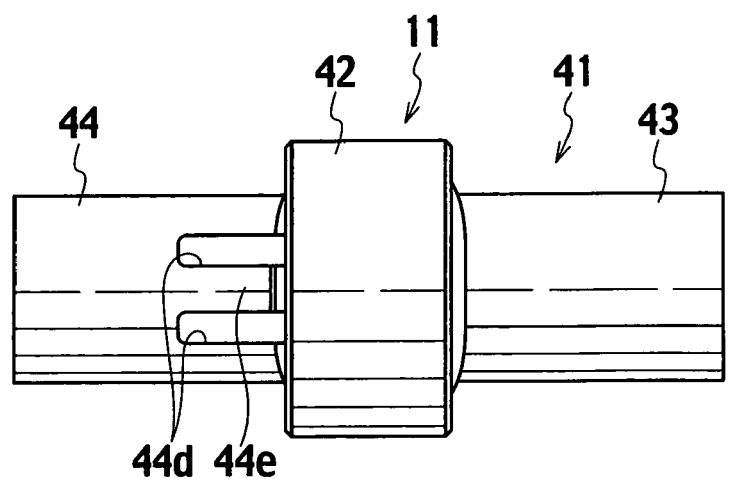
Figure 10:
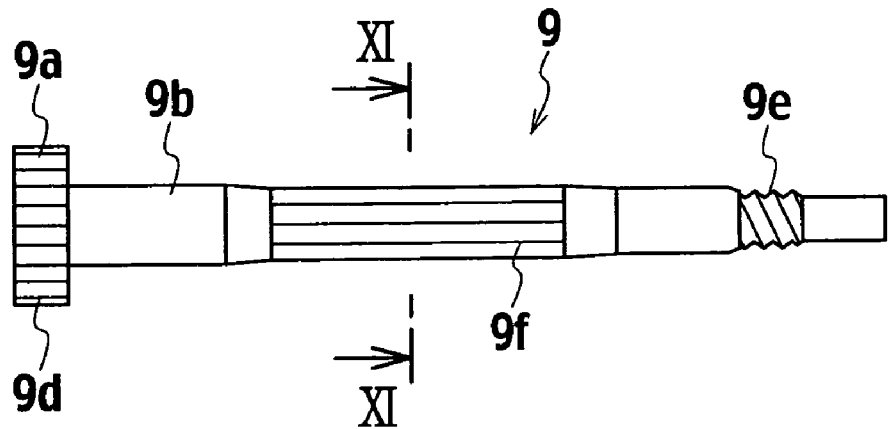

FIGS. 3A and 3B are axial cross-sectional views schematically showing a chief part of the steering column assembly. FIG. 3A is the cross-sectional view showing the steering column assembly being locked. FIG. 3B is the cross-sectional view showing the steering column assembly being released from locking;

FIG. 4 is a perspective assembly drawing of a cam body consisted of an eccentric cam and a ring;

FIG. 5 is a front view of the cam body;

FIG. 6 is an auxiliary cross-sectional view of FIG. 5 taken along the VI-VI line;

FIG. 7 is a plan view of the cam body;

FIG. 8 is a plan view showing how the eccentric cam with the ring being detached therefrom;

FIG. 9 is a perspective view showing how the eccentric cam with the ring being detached therefrom;

FIG. 10 is a plan view of a clamp bolt; and

Figure 11:
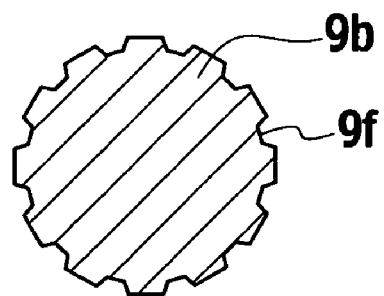

FIG. 11 is an auxiliary cross-sectional view of FIG. 10 taken along the line XI-XI.

DETAILED DESCRIPTION OF THE PREFERRED EMBODIMENT

Figure 1:
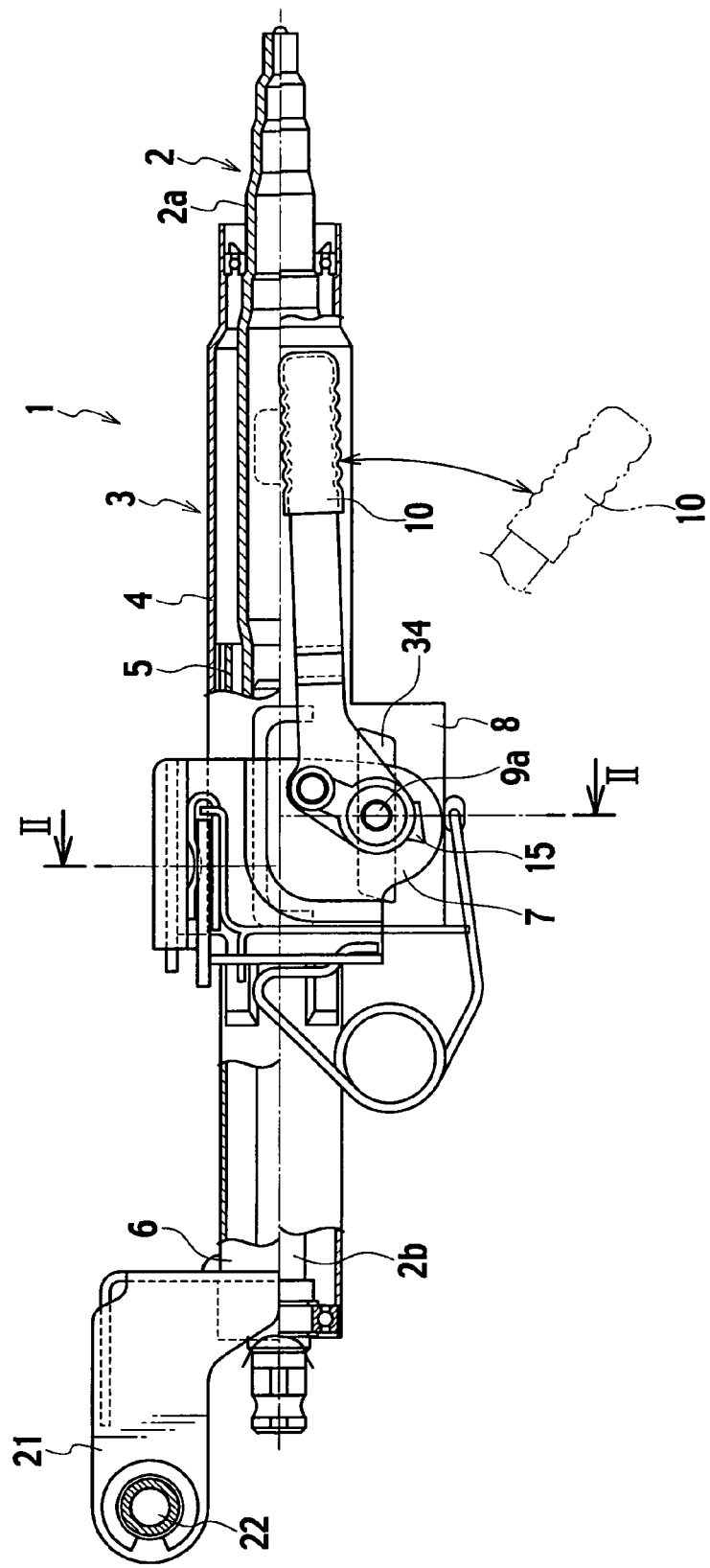
FIG. 1 is a front view of a steering column assembly according to an embodiment of the present invention.
Figure 2:
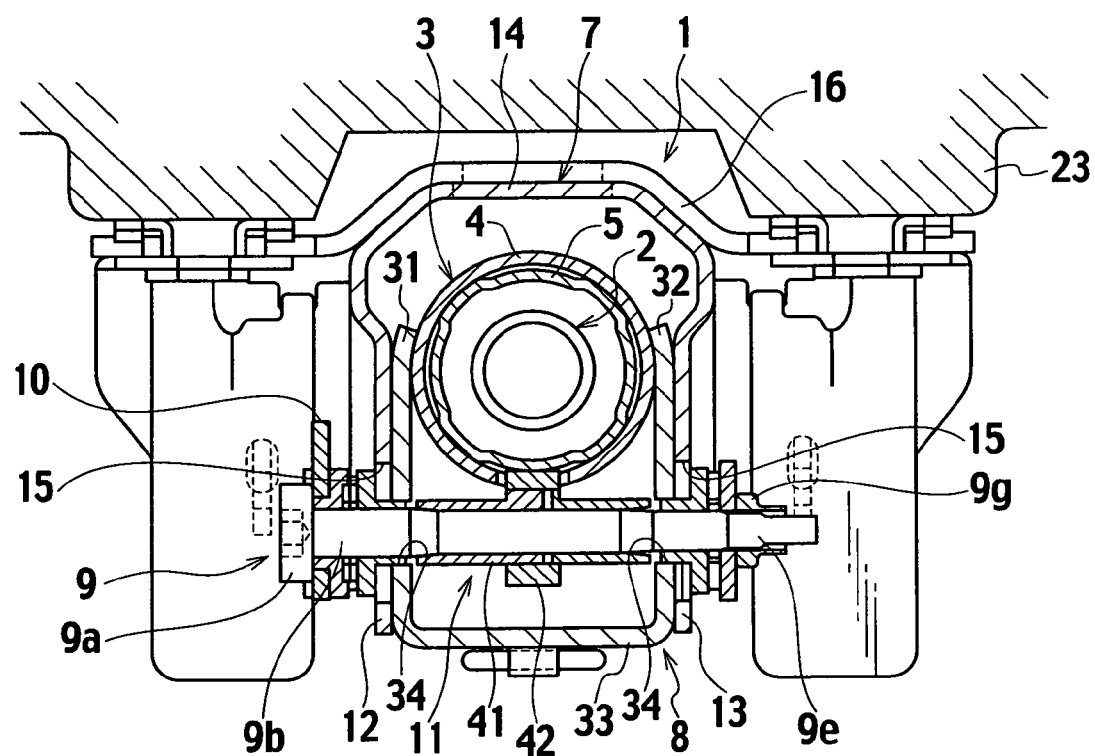
FIG. 2 is an auxiliary cross-sectional view of FIG. 1 taken along the line II-II.

Descriptions will be provided hereinbelow for the embodiment of the present invention by referring to the drawings. FIG. 1 is a front view of a steering column assembly according to an embodiment of the present invention. FIG. 2 is an auxiliary cross-sectional view of FIG. 1 taken along the line II-II. FIGS. 3A and 3B are axial cross-sectional views schematically showing a chief part of the steering column assembly. FIG. 3A is the cross-sectional view showing the steering column assembly being locked. FIG. 3B is the cross-sectional view showing the steering column assembly being released from locking. FIG. 4 is a perspective assembly drawing of a cam body consisted of an eccentric cam and a ring. FIG. 5 is a front view of the cam body. FIG. 6 is an auxiliary cross-sectional view of FIG. 5 taken along the VI-VI line. FIG. 7 is a plan view of the cam body. FIG. 8 is a plan view showing how the eccentric cam with the ring being detached therefrom. FIG. 9 is a perspective view showing how the eccentric cam with the ring being detached therefrom. FIG. 10 is a plan view of a clamp bolt. FIG. 11 is an auxiliary cross-sectional view of FIG. 10 taken along the line XI-XI. Note that FIG. 1 shows the steering column assembly with its parts being removed for convenience in description.

As shown in FIGS. 1 and 2, a steering column assembly 1 according to the present embodiment includes a steering column tube 3 rotatably and pivotally supporting a steering shaft 2. A steering wheel (not illustrated) is fixed to an axial upper end (right end in FIG. 1) of the steering shaft 2. The steering shaft 2 is configured of an upper shaft 2a and a lower shaft 2b, which are fitted to each other so as to be slidable relative to each other in an axial direction thereof.

The steering column tube 3 includes an outer tube 4 and an inner tube 5 which are fitted to each other in such a way as to be capable of sliding relative to each other in the axial direction. These tubes 4, 5 rotatably and pivotally support the steering shaft 2 therein.

An axial lower end part 6 of the inner tube 5 is fixed to a lower support bracket 21 by welding or the like. Thereby, the axial lower end part 6 is supported by a vehicle body 23 through a tilt shaft 22. This makes the entire steering column tube 3 rotatable about the tilt shaft 22.

This steering column assembly 1 includes: an upper clamp 7 serving as a clamp, arranged in an axial upper end side of the steering column tube 3, fixed to the vehicle body 23, and shaped like substantially an alphabet U opened downward; the distance bracket 8 fixed to the outer tube 4 of the steering column tube 3 by welding or the like, and arranged inside the upper clamp 7; the clamp bolt 9 penetrating the upper clamp 7 and the distance bracket 8; the operation lever 10 rotated about the axis of the bolt 9; and the cam body 11 rotating in response to the rotation of the operation lever 10, and pressing the inner tube 5 against the outer tube 4.

The upper clamp 7 includes: paired side plates 12, 13 opposed to each other; and an upper plate 14 connecting the upper portions of the respective side plates 12, 13 together. The upper clamp 7 is fixed to the vehicle body 23 with an installation bracket 16. Arc-shaped tilt long holes 15 are formed in the respective two side plates 12, 13 of the upper clamp 7 in the upward-downward direction of the vehicle.

The distance bracket 8 is almost shaped like an alphabet U opened upward, including: paired side plates 31, 32; and a bottom plate 33 connecting the lower ends of the respective side plates 31, 32 together. Telescopic long holes 34 (hole parts) are formed in the respective side plates 31, 32 of the distance bracket 8 extending in the direction of the steering column tube 3.

As shown in FIGS. 10 and 11, the clamp bolt 9 includes a head 9a and a shank 9b, and penetrates the upper clamp 7 from one side to the other thereof. The head 9a has a hexagonal hole in its end portion. Serrations 9d extending in an axial direction of the clamp bolt 9 are formed in the outer periphery of the head 9a. The shank 9b has a screw part 9e in its end. Other serrations 9f extending in the axial direction of the clamp bolt 9 are formed in the outer periphery of a middle portion of the shank 9b in the longitudinal direction. By screwing a nut 9g to the screw part 9e in the end of the bolt 9, the upper clamp 7 and the distance bracket 8 are clamped between the head 9a and the nut 9g of the bolt 9.

The cam body 11 includes: a resin-made eccentric cam 41 being arranged on the shank 9b of the bolt 9, with the radial dimension progressively changing in a circumferential direction thereof; and the ring 42 being rotatably fitted on the outer periphery of the eccentric cam 41. The eccentric cam 41 is configured of paired cylindrical parts 43, 44 which extend in their respective axial directions. One end of the cylindrical part 43 is connected to one end of the cylindrical part 44. A larger-diameter part 43a being eccentric in its radial direction is formed in the connected end portions of the respective cylindrical parts 43, 44. The outer diameter of the larger-diameter part 43a is set larger than the outer diameters of the respective cylindrical parts 43, 44, but is set slightly smaller than the inner diameter of the ring 42. As shown in FIG. 5, the eccentric cam 41 rotates about the rotation center C1. The rotation center C2 of the larger-diameter part 43a is eccentric from this rotation center C1 by a predetermined distance D1 in the radial direction.

When the inner tube 5 is locked to the outer tube 4, as shown in FIG. 3A, the larger-diameter part 43a and the ring 42 enter the outer tube 4 through a through-hole 4a formed in a portion of the outer tube 4 which overlaps a portion of the inner tube 5. Thus, the ring 42 is pressure-contacted to and engaged with (locked to) the inner tube 5. In addition, when the inner tube 5 is unlocked from the outer tube 4, as shown in FIG. 3B, the larger-diameter part 43a and the ring 42 retracted to the outside of the outer tube 4. Thus, the ring 42 is detached from the inner tube 5. Thereby, the inner tube 5 is released from its locked condition in which the inner tube 5 is pressed against the outer tube 4. While the ring 42 engages with the inner tube 5 in the locked or unlocked condition, friction between the ring 42 and the inner tube 5 stops the ring 42 from rotating. In contrast, while the ring 42 does not engage with the inner tube 5, the ring 42 rotates together with the eccentric cam 41. Note that, by rotating the eccentric cam 41 from an unlock position shown in FIG. 3B to a lock position shown in FIG. 3A with 180°, a cam lift amount D2 (equal to D1×2) can be obtained.

Serrations 43b and 44b are respectively formed in the inner peripheries of the cylindrical parts 43 and 44. The bolt 9 is inserted into the inner peripheries of the cylindrical parts 43, 44. The serrations 9f in the outer periphery of the shank 9b mesh with the serrations 43b and 44b of the inner peripheries of the cylindrical parts 43 and 44. Thereby, a rotational force of the bolt 9 is transmitted to the eccentric cam 41.

Engagement grooves 42a, 42b are provided to the two end portions of the inner periphery of the ring 42, respectively. The cylindrical parts 43, 44 are provided with flange members 43c, 44c arranged so as to interpose the ring 42 from the both sides thereof in an axial direction between the flange members 43c, 44c and engaging with the engagement grooves 42a, 42b, respectively. In addition, paired elastic claws 44e each including a part of the flange member 44c are formed as follows. One elastic claw 44e is formed by providing paired cuttings 44d in the connected end portion of the cylindrical part 44 and the most eccentric portion of the flange member 44c in the radial direction. The other elastic claw 44e is formed by providing the other paired cuttings 44d in a portion opposed to the one elastic claw 44e. All the cuttings 44d extend in parallel to one another in the axial direction.

The cam body 11 is assembled as follows. The ring 42 is fitted, from one side of the cylindrical part 44 of the eccentric cam 41, thereonto until hitting the flange member 43c, and thus the flange member 43c is engaged with the engagement groove 42a in the ring 42. Thereby, the ring 42 is fitted on the outer periphery of the larger-diameter part 43a. At this time, the flange member 44c is engaged with the engagement groove 42b in the ring 42 while the ring 42 keeps in contact with a tapered portion of the flange member 44c to press the paired elastic claws 44e in an inner radial direction. Thereafter, the paired elastic claws 44e return to the original condition with their respective elastic forces. Thereby, the ring 42 is fitted on the other side of the cylindrical part 44. This causes the ring 42 fitted on the outer periphery of the eccentric cam 41 to be rotatably supported by the eccentric cam 41.

Descriptions will be provided for how the steering column assembly operates. By being screwed up by rotating the operation lever 10 to the lock position indicated with solid lines in FIG. 1, the bolt 9 holds the upper clamp 7 and the distance bracket 8 to be relatively immovable between the head 9a and the nut 9g thereof. This arrangement disables the steering wheel from being applied tilt adjustment (being swung in the upward-downward direction of the vehicle) or telescopic adjustment (being swung in the axial direction of the steering column assembly). At the same time, as shown in FIG. 3A, the eccentric cam 41 is rotated in a lock direction (in a direction indicated with an arrow A1), and thus the ring 42 is moved toward the inner tube 5 (in a direction indicated with an arrow A2), to be pressure-contacted to and engaged with the inner tube 5. Thereby, the inner tube 5 is pressed against the outer tube 4. This mechanism eliminates play (space between the inner tube 5 and the outer tube 4 in the radial direction).

In addition, when being loosened by rotating the operation lever 10 to the unlock position indicated with broken lines in FIG. 1, the bolt 9 causes the upper clamp 7 and the distance bracket 8 to be relatively movable between the head 9a and the nut 9g of the bolt 9. This arrangement enables both a tilt adjustment and a telescopic adjustment to be applied to the steering wheel. At the same time, as shown in FIG. 3B, the eccentric cam 41 is rotated in the unlock direction (in a direction indicated with an arrow A3), and is moved in a direction in which the eccentric cam 41 is detached from the inner tube 5 (in a direction indicated with an arrow A4). Thereby, the inner tube 5 is released from its locked condition, being pressed against the outer tube 4. This enables the outer tube 4 to be telescopically adjusted relative to the inner tube 5 (to be slid in the axial direction) with a smaller operation force.

In this embodiment, as shown in FIG. 3A, the eccentric cam 41 is pressure-contacted to and engaged with the inner tube 5 with the ring 42 fitted on the outer periphery thereof. This arrangement makes it possible to decrease the radial dimension R of the eccentric cam 41. Accordingly, it is possible to reduce a clamping torque which needs to be applied to the clamp bolt 9 when the eccentric cam 41 is rotated to lock the inner tube. For this reason, this embodiment is capable of reducing the operation force needed to be applied to the operation lever 10, and accordingly of enhancing the operability.

In addition, when a force is applied to the steering column tube 3 in a direction in which the steering column tube 3 contacts while the inner tube 5 is being locked to the outer tube 4 by pressing the outer peripheral surface of the ring 42 against the inner tube 5, the ring 42 is biased in an unlock direction by a friction force through the inner tube 5, and thus the ring 42 rotates. However, it is possible to prevent the eccentric cam 41 from rotating in the unlock direction because the ring 42 slips on the eccentric cam 41. For this reason, the inner tube can be kept being locked to the outer tube firmly. Moreover, the radial dimension R of the eccentric cam 41 is smaller than that of an eccentric cam which does not provide with a ring 42. This decreases a torque for driving the eccentric cam 41 in the unlock direction when the eccentric cam 41 is biased in the unlock direction with the ring 42. In this respect, it is possible to prevent the eccentric cam 41 from rotating in the unlock direction.

According to this embodiment, each of the bolt 9 and the eccentric cam can 41 be easily formed with a material and shape which differ from one to another depending on a function which each of the bolt 9 and the eccentric cam 41 is required to play since each of the bolt 9 and the eccentric 41 cam is formed in a separate body. For example, the bolt 9 is made of a metal, and the eccentric cam 41 is made of a resin.

Moreover, in this embodiment, the ring 42 is fitted on the outer periphery of the eccentric cam 41, and concurrently is rotatably supported by the elastic claws 44e provided to the eccentric cam 41. This makes it possible to easily assemble the cam body 11 which includes the eccentric cam 41 and the ring 42.

The foregoing descriptions have been provided for the preferred embodiment of the present invention. However, the present invention is not limited to the above-described embodiment, and can be modified variously.

In the embodiment, the ring 42 is rotatably fitted on the outer periphery of the eccentric cam 41. Instead, for example, coating or grease made of a low-friction material may be installed between the eccentric cam 41 and the ring 42. Alternatively, a bearing may be installed between the eccentric cam 41 and the ring 42 to decrease the friction therebetween. This makes it possible to reduce the operation force needed to be applied to the operation lever.

In addition, this embodiment shows the case where the bolt 9 and the eccentric cam 41 are formed as separate bodies. If, alternatively, the bolt and eccentric cam are formed integrally instead of being formed as the separate bodies, it is possible to reduce parts in number.

Furthermore, this embodiment shows the case where the ring 42 rotatably fitted on the outer periphery of the eccentric cam 41 is provided to the steering column assembly. If another ring whose plate thickness differs in the radial direction is additionally provided to the steering column assembly, the steering column assembly can be used for vehicles among which the distance between the operation lever 10 and the inner tube 3 of the steering column tube 3 is different by use of the same eccentric cam 41.

Moreover, in this embodiment, the steering column assembly structurally enables the tilt adjustment and the telescopic adjustment. However, the steering column assembly which is only capable of performing the telescopic adjustment brings about the same operating effects.

The present invention is not limited to what has been described above, or what has been described for the embodiment of the present invention. The present invention can be carried out as other various aspects being modified depending on the necessity.

Note that the entire contents of Japanese Patent Application No. 2007-283851 (filed on Oct. 31, 2007) are incorporated herein by reference.

What is claimed is:

1. A steering column assembly comprising:
   an inner tube having an end being supported by a vehicle body, and rotatably and pivotally supporting a lower shaft therein;
   an outer tube having an end being supported by a clamp fixed to the vehicle body, rotatably and pivotally supporting an upper shaft therein, arranged in an outer periphery of the inner tube so as to be slidable in an axial direction so that a telescopic adjustment is possible, and having a through-hole opened in the axial direction in a portion overlapped with the inner tube;
   a distance bracket fixedly arranged in the outer tube;
   a clamp bolt including a shank rotatably and pivotally supported by the clamp and a long hole part formed in the distance bracket;
   an operation lever configured to rotate integrally with the clamp bolt;
   an eccentric cam arranged on the shank of the clamp bolt, and having an radial dimension gradually changing in a circumferential direction thereof; and
   a ring rotatably fitted on an outer periphery of the eccentric cam,
   wherein by rotationally operating the operation lever so as to rotate the eccentric cam and thus pressing the ring against the inner tube, so that the inner tube is pressure-contacted to and engaged with the outer tube.

2. The steering column assembly according to claim 1, wherein
   a hole part of the clamp is formed as an arc-shaped long hole extending in an upward-downward direction of the vehicle so that a tilt adjustment is possible.

3. The steering column assembly according to claim 2, wherein
   the bolt and the eccentric cam are formed as separate bodies.

4. The steering column assembly according to claim 3, wherein
   the eccentric cam includes an elastic claw and a flange member; and
   by using of the elastic claw and the flange member, the ring is rotatably engaged with and held by the outer periphery of the eccentric cam.

5. The steering column assembly according to claim 2, wherein
   the eccentric cam includes an elastic claw and a flange member; and
   by using of the elastic claw and the flange member, the ring is rotatably engaged with and held by the outer periphery of the eccentric cam.

6. The steering column assembly according to claim 1, wherein
   the bolt and the eccentric cam are formed as separate bodies.

7. The steering column assembly according to claim 6, wherein
   the eccentric cam includes an elastic claw and a flange member; and
   by using of the elastic claw and the flange member, the ring is rotatably engaged with and held by the outer periphery of the eccentric cam.

8. The steering column assembly according to claim 1, wherein
   the eccentric cam includes an elastic claw and a flange member; and
   by using of the elastic claw and the flange member, the ring is rotatably engaged with and held by the outer periphery of the eccentric cam.

* * * * *